United States Patent
Goth, III et al.

(10) Patent No.: US 10,387,430 B2
(45) Date of Patent: Aug. 20, 2019

(54) GEOMETRY-DIRECTED ACTIVE QUESTION SELECTION FOR QUESTION ANSWERING SYSTEMS

(71) Applicant: International Business Machines Corporation, Armonk, NY (US)

(72) Inventors: Julius Goth, III, Franklinton, NC (US); Dwi Sianto Mansjur, Cary, NC (US); Kyle L. Croutwater, Chapel Hill, NC (US); Beata Strack, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 14/632,456

(22) Filed: Feb. 26, 2015

(65) Prior Publication Data
US 2016/0253596 A1    Sep. 1, 2016

(51) Int. Cl.
*G06F 16/245* (2019.01)
*G06N 20/00* (2019.01)
(Continued)

(52) U.S. Cl.
CPC ....... *G06F 16/24578* (2019.01); *G06N 5/022* (2013.01); *G06N 20/00* (2019.01); *G09B 7/00* (2013.01); *G09B 7/02* (2013.01)

(58) Field of Classification Search
CPC .......... G06N 5/02; G06N 99/00; G06N 20/00; G06F 17/30; G06F 16/24578
See application file for complete search history.

(56) References Cited

U.S. PATENT DOCUMENTS 7,483,864 B2    1/2009 Osoda et al.
7,603,330 B2    10/2009 Gupta et al.
(Continued)

FOREIGN PATENT DOCUMENTS

WO    2003071480 A1    8/2003

OTHER PUBLICATIONS

Liu, Tie-Yan. "Learning to rank for information retrieval." Foundations and Trends® in Information Retrieval 3.3 (2009): 225-331.*
(Continued)

*Primary Examiner* — Eric Nilsson
(74) *Attorney, Agent, or Firm* — Diana Roberts Gerhardt; David H. Judson

(57) ABSTRACT

An active learning framework is operative to identify informative questions that should be added to existing question-answer (Q&A) pairs that comprise a training dataset for a learning model. In this approach, the question-answer pairs (to be labeled as "true" or "false") are automatically selected from a larger pool of unlabeled data. A spatial-directed clustering algorithm partitions the relevant question-answer space of unlabeled data. A margin-induced loss function is then used to rank a question. For each question selected, a label is then obtained, preferably by assigning a prediction for each associated question-answer pair using a current model that has been trained on labeled question-answer pairs. After the questions are labeled, an additional re-sampling is performed to assure high quality of the training data. Preferably, and with respect to a particular question, this additional re-sampling is based on a distance measure between correct and incorrect answers.

21 Claims, 5 Drawing Sheets

(51) Int. Cl.
*G06N 5/02* (2006.01)
*G06F 16/2457* (2019.01)
*G09B 7/00* (2006.01)
*G09B 7/02* (2006.01)

(56) References Cited

U.S. PATENT DOCUMENTS

| | | |
|---|---|---|
| 2009/0024607 A1 | 1/2009 | Sun et al. |
| 2013/0024457 A1* | 1/2013 | Chua .................. G06F 17/3061 707/740 |
| 2013/0097103 A1* | 4/2013 | Chari .................. G06N 99/005 706/12 |
| 2013/0111005 A1 | 5/2013 | Chu et al. |

OTHER PUBLICATIONS

Nigam et al, "Using EM to Classify Text From Labeled and Unlabeled Documents," Technical Report CMU-CS-98-120, Carnegie Mellon University, 1998.

He et al, "Nearest-neighbor-based active learning for rare category detection," Advances in Neural Information Processing Systems, 2007.

* cited by examiner

FIG. 5

| Algorithm-Initialization |
|---|
| $L$ - initial labeled dataset —504<br>$U$ - unlabeled data —506<br>$N$ - number of partitions of U (number of iterations)<br>$M$ - number of questions to be labeled each iteration |
| $S = \{U_1,...,U_N\} \leftarrow$ split $(U,N)$ —508<br>$\tilde{h}_0 \leftarrow$ train $(L)$ —510<br>$T_0 \leftarrow$ resample $(L, h_{-1}, r)$<br>$h_0 \leftarrow$ train $(T_0)$ |
| Algorithm-Main loop |
| for $1,...,N$<br>    for each question Q in $D_i$<br>        Calculate total margin $m_Q$ (see text) using prediction of the classifier $h_{i-1}$ ◄—516<br>    end for<br>    Choose questions $Q_1,..., Q_M$ corresponding to M largest values of margin ◄—518<br>    $\tilde{T}_i \leftarrow$ resample$^{(label(Q_1 \cup ... \cup Q_M), h_{i-1}, r)}$ ◄—522<br>    $T_i \leftarrow T_{i-1} \cup ... \tilde{T}_i$ ◄—524<br>    $h_i \leftarrow$ train $(T_i)$ ◄—526<br>end for |

500, 512

| Re-sample Procedure - Initialization |
|---|
| $D$ - initial dataset (labeled)<br>$h$ - classifier (model)<br>$r$ - fraction of false questions to be included<br>$M$ - number of questions drawn each interation (random sample size)<br><br>$D_0 \leftarrow$ all questions from $D$ correctly classified by $h$<br>$C_0 \leftarrow$ all questions from $D$ incorrectly classified by $h$ (false questions, see text) |
| $N \leftarrow r|C_0|$ |
| Selection - Main loop |
| for i = 1,...,N<br>    $m_i \leftarrow \min\{C_{i-1}, M\}$<br>    $R_i = \{Q_1,...,Q_{m_i}\} \leftarrow \text{random}(C_{i-1}, m_i)$<br>    for each question Q in $R_i$<br>        Calculate the distance $d_Q$ between correct and incorrect answers in $D_{i-1} \cup Q$<br>    end for<br>    Choose a question $\tilde{Q}$ corresponding to the largest $d_{Q_i}$<br>    $C_i \leftarrow C_{i-1} \setminus \tilde{Q}$<br>    $D_i \leftarrow D_{i-1} \cup$<br>end for |

Labels: 700, 702, 704, 706, 708

FIG. 7

GEOMETRY-DIRECTED ACTIVE QUESTION SELECTION FOR QUESTION ANSWERING SYSTEMS

BACKGROUND OF THE INVENTION

Technical Field

This disclosure relates generally to information retrieval using question answering systems and, in particular, obtaining training data for such systems.

Background of the Related Art

Question answering (or "question and answering," or "Q&A") is a type of information retrieval. Given a collection of documents (such as the World Wide Web or a local collection), a Q&A system should be able to retrieve answers to questions posed in natural language. Q&A is regarded as requiring more complex natural language processing (NLP) techniques than other types of information retrieval, such as document retrieval, and it is sometimes regarded as the next step beyond search engines. Closed-domain question answering deals with questions under a specific domain (for example, medicine or automotive maintenance), and it can be seen as an easier task because NLP systems can exploit domain-specific knowledge frequently formalized in ontologies. Open-domain question answering deals with questions about nearly everything, and they can only rely on general ontologies and world knowledge. These systems usually have much more data available from which to extract the answer. Systems of this type are implemented as one or more computer programs, executed on a machine (or a set of machines). Typically, user interaction with such a computer program either is via a single user-computer exchange, or a multiple turn dialog between the user and the computer system. Such dialog can involve one or multiple modalities (text, voice, tactile, gesture, or the like). The challenge in building such a system is to understand the query, to find appropriate documents that might contain the answer, and to extract the correct answer to be delivered to the user.

Question answering systems, such as IBM® Watson, require large amount of training data. Obtaining high quality of data, however, is very difficult in any real application. In particular, it may be expensive to have a domain expert annotate large amount of answers as either correct or incorrect to provide the training dataset. Machine learning principles, such as active learning, can save the human experts' time (and thus ameliorate this cost to some degree) by identifying discriminative questions automatically. Then, the human experts can label the correct answers for the discriminative questions selected by the machine learning models, or a machine learning model can label the data autonomously.

Known active learning frameworks, however, have several drawbacks. First, the current frameworks work in a general feature space. Further, the decision about which data to use in the training is made at the level of training instances. In question answering systems, training instances correspond to answers, but the selection needs to be done at the level of questions, because otherwise the benefit of such system would be marginal. Another drawback is that, in the typical solution of this type, the spatial distribution of the training data is not taken into account. Rather, the geometry of the dataset is reflected in nearest neighbor-based algorithms, but these do not translate directly into the question space. In addition, in the existing active learning systems, once a data point is labeled, it is automatically included in the training set. This approach does not assure high quality training data, especially because it does not prevent inclusion of outliers or noise.

Thus, there remains a need to provide techniques to obtain high quality and highly-diversified question-answer pairs to facilitate training of a Q&A system.

BRIEF SUMMARY

Generally, this disclosure provides for a method operative in an active learning environment to select questions that can be used to train a statistical machine learning model in a question answering (Q&A) system.

According to the approach described herein, an active learning framework is operative to identify informative questions that should be added to existing question-answer (Q&A) pairs that comprise a training dataset for a learning model. In this approach, the question—answer pairs (that will be labeled as "true" or "false" and used in the learning model) are automatically selected from a larger pool of unlabeled data. In a representative embodiment, the technique uses a spatial-directed clustering algorithm to first partition the relevant question-answer space of unlabeled data. A margin-induced loss function is then used to rank a question. In particular, preferably each question is ranked based on its contribution to a decision boundary and its contribution to the statistical model. The top ranked questions are then selected. For each question selected, a label is then obtained, either by querying an external oracle (e.g., human expert), or by assigning a prediction for each associated question-answer pair using the current model. After the questions are labeled, an additional re-sampling is performed to assure high quality of the training data. Preferably, and with respect to a particular question, this additional re-sampling is based on a distance measure between correct and incorrect answers.

To facilitate the ranking and question selection process, a set of questions from the set of unlabeled data are first classified according to question identifiers to group different answers. An answer class distribution is then estimated for each question identifier. The answer class distribution comprises a true answer distribution, and a false answer distribution. A loss of each is then computed, as is an average loss of the questions. This information is then used by an algorithm to facilitate ranking of the questions. This algorithm operates to minimize the selected number of questions from the set of questions while also reducing the average loss.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 5 depicts a high level process flow for the active learning framework of this disclosure;

FIG. 7 illustrates a re-sampling procedure that is used to facilitate the question selection process of this disclosure.

DETAILED DESCRIPTION OF AN ILLUSTRATIVE EMBODIMENT

Figure 1:
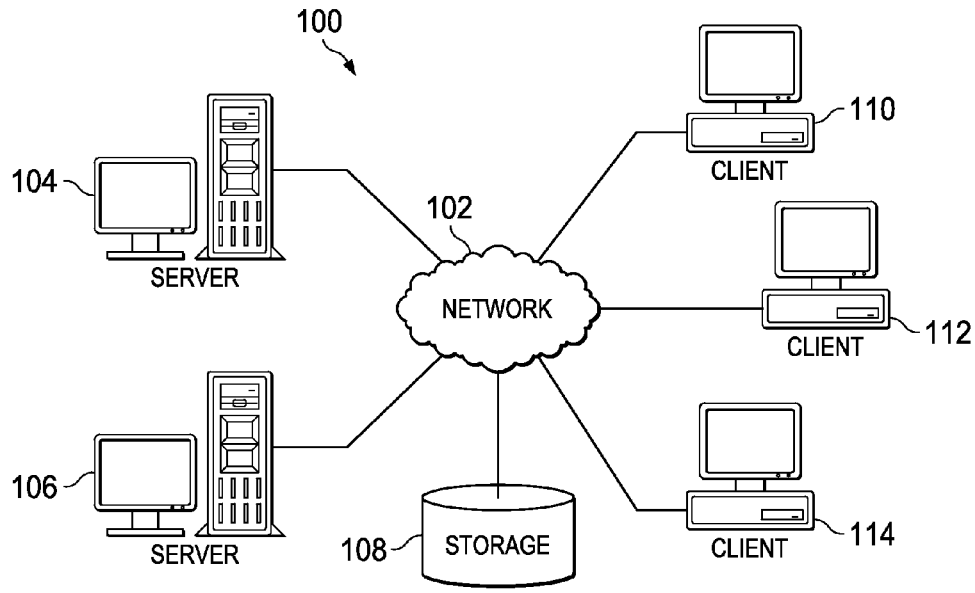
FIG. 1 depicts an exemplary block diagram of a distributed data processing environment in which exemplary aspects of the illustrative embodiments may be implemented.
Figure 2:
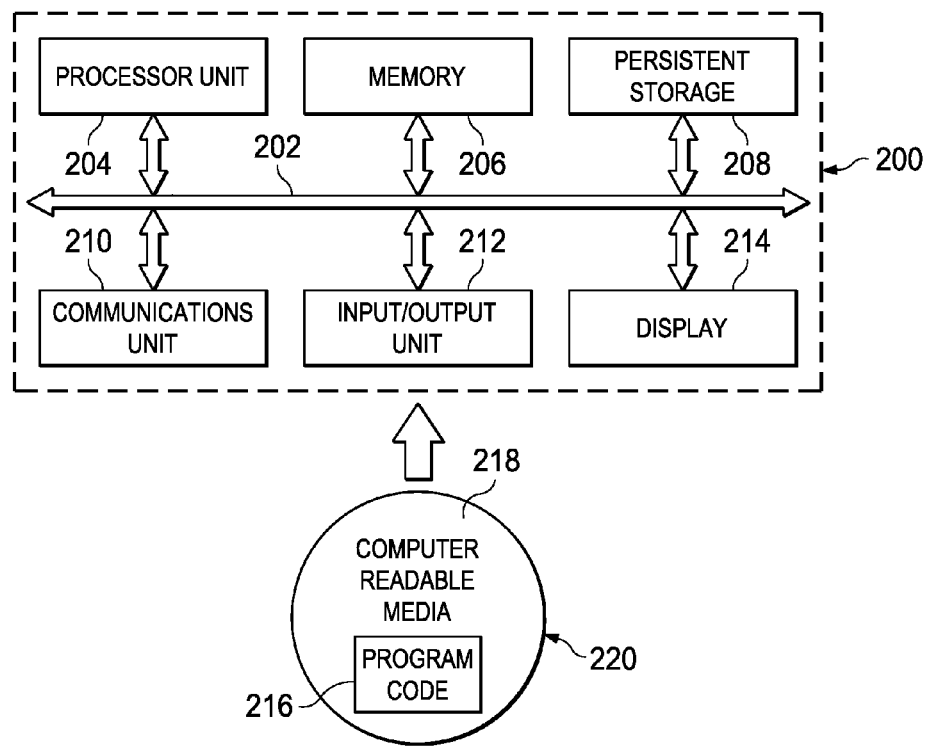
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Question Answering

As noted above, question answering (or "question and answering," or "Q&A") is a type of information retrieval.

In the past, understanding a query was an open problem because computers do not have human ability to understand natural language, nor do they have common sense to choose from many possible interpretations that elementary natural language understanding systems can produce. A solution that addresses this problem is IBM® Watson, which may be described as, among other things, as an open-domain Q&A system that is an NLP artificial intelligence (AI)-based learning machine. A machine of this type may combine natural language processing, machine learning, and hypothesis generation and evaluation; it receives queries and provides direct, confidence-based responses to those queries. A Q&A solution such as IBM Watson may be cloud-based, with the Q&A function delivered "as-a-service" (SaaS) that receives NLP-based queries and returns appropriate answers.

A representative Q&A system, such as described in U.S. Pat. No. 8,275,803, provides answers to questions based on any corpus of data. The method facilitates generating a number of candidate passages from the corpus that answer an input query, and finds the correct resulting answer by collecting supporting evidence from the multiple passages. By analyzing all retrieved passages and that passage's metadata in parallel, there is generated an output plurality of data structures including candidate answers based upon the analyzing step. Then, by each of a plurality of parallel operating modules, supporting passage retrieval operations are performed upon the set of candidate answers; for each candidate answer, the data corpus is traversed to find those passages having candidate answer in addition to query terms. All candidate answers are automatically scored causing the supporting passages by a plurality of scoring modules, each producing a module score. The modules scores are processed to determine one or more query answers; and, a query response is generated for delivery to a user based on the one or more query answers.

A Q&A system of this type uses machine learning to help generate the most confident hypothesis, typically by ranking the large numbers of potential answers from its database. Machine learning enables this type of system to be trained on industry- or solution-specific data, and then to create a statistical model which the system can then apply to new queries. In operation, the system ingests data, and then uses its NLP capabilities to distill the information into a form that can be ranked later in a processing pipeline. Once in the pipeline, different processes and algorithms establish different potential solutions based on the context of the data. The last step in the pipeline is the ranking of the solutions, where the system analyzes all of the potential answers and uses its machine learning model to determine whether or not it is the correct one. The system then puts all of the information and solutions together and assigns a confidence rating to the solutions that are ranked the highest.

The machine learning model used in the Q&A system typically is trained with question and answer "pairs." For each unique question, there are a set of one or more answers associated with the question. Theoretically, each question-answer pair may form a unique training instance for the Q&A system. One of the main tasks of a Q&A system is to decide if an answer can be placed in a "true" category, or whether it should be placed in a "false" category. Machine learning algorithms assign true/false "labels" to question/answer pairs that have been broken down, e.g., into feature vectors, or series of numbers, that represent the data of the question/answer pairs. In particular, the system analyzes the feature vectors of a potential answer and assigns a "true" label if the system believes the answer is correct, and a "false" label if it believes the answer is not correct. Typically, there are many more times as many false answers as true answers for each question. This class imbalance problem may cause a classifier to be overwhelmed by the false answers and ignore the true answers. Thus, during training of the machine learning models in the Q&A system, there is a need to select discriminating questions.

Interacting with an NLP System

By way of additional background, the following describes one use case using an NLP system such as described above.

Figure 3:
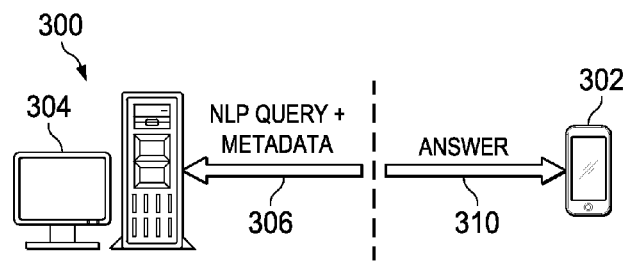
FIG. 3 illustrates a device interacting with a question and answer (Q&A) system, such as a natural language processing (NLP)-based artificial intelligence (AI) learning machine.

Referring to FIG. 3, the basic interaction is shown. As one of ordinary skill will appreciate, the interaction is based on the client-server model in FIG. 1, and the computing entities correspond to the example in FIG. 2.

According to this embodiment, a computing entity (such as a mobile device) 302 interacts with question and answer (Q&A) system 304, such as a natural language processing (NLP)-based artificial intelligence (AI) learning machine described above. The Q&A system 304 typically is located remotely from the domain, such as in remote location 300, although this is not a limitation or requirement. In the usual case, the Q&A system 304 is accessible over a network, such as a wired or wireline network, a public or private network, or the like. The mobile device interacts with the Q/A system by making queries and receiving answers. A query and its answer may be provided over any suitable transport, securely or in the clear. The mobile device may interact with the Q&A system using a conventional request-response protocol, programmatically, interactively, or otherwise.

Preferably, and as described above, the Q&A system 304 is based on an NLP AI-based learning machine, such as IBM Watson. The use of the described machine is not a limitation, as any Q&A (or, more generally, machine learning) program, tool, device, system, or the like may comprise system 304. Generally, and as has been described, the system 404 combines natural language processing, machine learning, and hypothesis generation and evaluation; preferably, the system 304 receives queries and provides direct, confidence-based responses to those queries. The system may be cloud-based and implemented as a service, or it may be a stand-alone functionality. Regardless of how the Q&A system is implemented, it is assumed to be capable of receiving NLP-based queries and returning answers. As used herein, a "question" and "query," and their extensions, are used interchangeably and refer to the same concept, namely request for information. Such requests are typically expressed in an interrogative sentence, but they can also be expressed in other forms, for example as a declarative sentence providing a description of an entity of interest (where the request for the identification of the entity can be inferred from the context). The particular manner in which the Q&A system processes queries and provides responses is not an aspect of this disclosure.

When the user performs an action on the device, some form of management application (depending on the use case) converts that action into an NLP query 306 directed to the Q&A system 304. The query may be accompanied by metadata associated with the user, the device or its state. Upon receipt of the query and any associated metadata, the Q&A system 304 makes a determination (again, based on the use case) and returns a response 310. Based on the response, the user's computing device may take a given action, such as a policy enforcement action.

Geometry-directed Active Question Selection for Q&A Systems

With the above as background, the subject matter of this disclosure is now described.

As will be seen, the techniques herein provide an automated way to actively select sets of questions to be included in a training dataset for a statistical machine learning (ML) model of a Q&A system. As will be described, the set of questions preferably are selected from a pool of unlabeled questions to be queried for their labels.

Without limitation, the active learning framework comprises one or more computational or computing entities, such as machines, programs, processes, databases, tools, interfaces, learning methods and models, and data sets.

Figure 4:
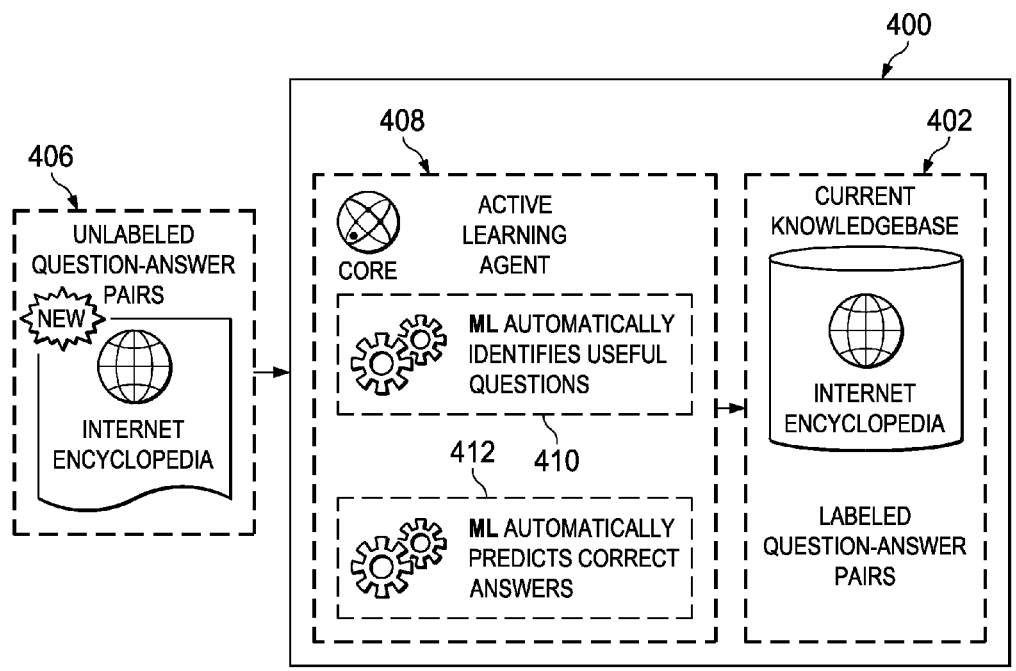
FIG. 4 depicts how an active learning framework of this disclosure receives and processed unlabeled data to select questions that will be used to train a statistical model for a Q&A system.

Referring now to FIG. 4, the active learning framework 400 works with (or is otherwise part of) an existing Q&A system of the type described above. The Q&A system has associated therewith a current knowledgebase 402. The current knowledge base 402 comprises a set of labeled (as "true" or "false") question-answer pairs. As depicted, there is at least one data source of new unlabeled data 406 assumed to be available. There may be many different sources of new unlabeled data. The new unlabeled data is provided to or otherwise received by the active learning framework. As new unlabeled data is received, an active learning agent 408 in the framework is operative to update the current knowledgebase 402, with or without human intervention. In a representative embodiment, the active learning agent is implemented as software, namely, a set of computer program instructions, executing in a hardware element, such as a processor. In particular, and as will be described, the active learning agent 408 relies on one or more machine learning (ML) models to actively identify useful questions either to assign or query for the labels of the identified unlabeled question-answer pairs. As will be described, preferably the learning process stops when all unlabeled answers have been considered for labeling. This learning strategy ensures that performance of the system is not degraded by the additional unlabeled information. The performance guarantee is achieved in part by using the statistical property of the machine learning models, as well as statistics of the labeled and unlabeled question-answer pairs.

FIG. 4 illustrates several steps operative in the active learning framework 400 of this disclosure. A set of labeled training question-answer (QA) pairs, and a set of unlabeled question-answer pairs, are assumed to be available to the framework. Preferably, the labeled QA pairs are used to provide an initial statistical model for the active learning framework, and this model is then used to facilitate the assignment of labels for the unlabeled QA pairs. As depicted, a first step 410 is to use a machine learning (ML) model to select informative questions to add to an existing dataset. This step, as will be described, preferably involves a geometry-directed question selection strategy that is based at least in part on applying a margin-induced loss function to rank the questions. In particular, preferably each question is ranked based on its contribution to a decision boundary (between true and false) and its contribution to the statistical model. The top ranked questions are then selected. This first step obviates use of human experts to identify useful questions.

As a result of executing the first step, a subset of the unlabeled dataset has been selected from the original pool of questions. The second step 412 is to acquire or predict the answer label for each question. The labels are predicted by the machine learning system using the current model, or they may be obtained by querying an external oracle (e.g., a human expert). Once the selected questions are labeled, preferably an additional re-sampling is performed based on a distance measure (between correct and incorrect answers) to further assure high quality of the training data. The resulting questions, which are considered to be highly "discriminative," are then used to train a machine learning model for a next iteration of the active learning framework. The process can then be re-iterated as necessary for additional unlabeled question-answer pairs.

Using this approach (i.e., leveraging the original training Q-A pairs along with the unlabeled Q-A pairs selected by the described selection procedures), a better statistical model is obtained, thereby enhancing the operation of the Q&A system.

In the approach of this disclosure, users (e.g. developers) are provided with a set of questions and answers labeled with "true" and "false" category. These are training instances. The system then receives new instances, preferably in the form of another set of question-answer pairs with no label in the category labels. A statistical classifier (a model) is then built from the labeled Q-A pairs to classify the Q-A pairs in the unlabeled set and/or in future (test) data.

Each question has a different number of "true" answers and a different number of "false" answers. In the case of labeled questions (from the first set), answers are associated with a true or false category for each question. For the unlabeled questions in the second set, however, an issue to be determined is how many true answers can be associated with each question. To address this issue, one or more question identifiers (question IDs) are assumed to be available during the training time. A question identifier is assigned for each question, and answers for the same questions have the same question ID. A particular question identifier is used to group different answers, and the answers (for the unlabeled questions) are assumed to be distributed in such a manner that multiple question identifiers exist for the answer set. A question identifier may correspond to a feature, a set of features, information in a feature vector, or the like.

According to this disclosure, a set of questions from the set of unlabeled data are first classified according to question identifiers to group different answers. An answer class distribution is then estimated for each question identifier. The answer class distribution comprises a true answer distribution, and a false answer distribution. A loss of each is then computed, as is an average loss of the questions. This information is then used by an algorithm to facilitate ranking of the questions. That algorithm has a goal to minimize the selected number of questions from the set of questions while also reducing the average loss. Indeed, a successful question selection means that fewer questions are required to be selected while achieving the same amount of accuracy for the training of the statistical model.

FIG. 5 illustrates the main algorithm for question selection according to this disclosure. The algorithm is initialized 500 with several datasets: L, an initial labeled dataset 504, U, an unlabeled dataset 506, N, a number of partitions of the unlabeled data set, and M, a number of questions to be labeled during each iteration of the algorithm.

At step 508, the unlabeled QA pairs are partitioned into multiple subsets. Preferably, the partitioning of the unlabeled dataset (the unlabeled QA pairs) is based on a spatially-directed clustering algorithm. This operation is advantageous as is helps assure that each of the sampled subsets is representative of the original dataset in terms of question distribution. One technique for implementing the splitting procedure in step 508 is using a k-dimensional (k-d) tree algorithm to incrementally partition the feature space, e.g., based on a dimension of the highest variance. In one embodiment, the stopping criteria used in the clustering algorithm may be based on classification error-bound estimators, such as Chernoff bounds and Batthacharya bounds. Although this partitioning operation is not necessarily required, it helps to assure that each of the sampled sets is representative of the original dataset in terms of question distribution, and it further ensures consistency with the manner in which Q&A systems are trained on large datasets.

At step 510, and using the initial labeled dataset, an initial statistical model $\hat{h}_0$ is trained.

The next step of the algorithm is the selection of a subset of questions in $U_n$ to be queried for their labels. The selection procedure, which is shown in the main loop 512, preferably is carried out according to this disclosure after questions are ranked based on a predicted "loss" of the question.

As used herein, preferably "loss" is defined as an average loss of answers classified as correct. This notion of "loss" is motivated by the nature of the datasets that are typically used in question answering systems. In particular, and as noted above, these datasets often are very imbalanced because there are only a few correct answers, and a lot of incorrect ones. According to the approach herein, given a classifier (model) h, preferably the loss for a question Q then is given by the following equation (step 516):

$$m(Q, h) = \frac{1}{|P(Q, h)|} \sum_{x \in P(Q,h)} \text{sigmoid}(\tilde{m}(x, h))$$

In the above equation, sigmoid( ) is a sigmoid function, and P(Q,h) is the set of all answers predicted as correct, that is:

$$P(Q, h) = \{x \in Q: h(x) \geq 1 - h(x)\}, \tilde{m}(x, h) = \log\left(\frac{h(x)}{1 - h(x)}\right)$$

where m(x,h) is a "margin" of an answer calculated in a logarithmic scale.

Conceptually, the margin is a separator, which is a simple embodiment is just a line in a two-dimensional space. The line typically is curved, although for simplicity it may be considered to be a straight line. Instances (questions) potentially appear on either side of the line, at a various distances from the line. The maximal distance from this line represents where high (or low) quality questions are presumed to exist, and the distance is correlated with the level of quality (or lack thereof, as the case may be).

Note that the sigmoid function can be substituted by another quantity that is more suitable, depending on the specific application.

In the remainder of this example, the questions lying farthest from the line are considered to have the highest quality. Thus, and at step 518, the questions with the largest margin are selected.

At step 520, the labels (for the selected questions in this iteration) are then queried for or otherwise obtained. In particular, and as noted above, the label querying operation typically involves predicting the answer label for the particular question using the current model, or querying an external oracle for that label.

Once the selected questions are labeled, preferably an additional re-sampling is then performed. This is step 522. Generally, the purpose of this re-sampling is to eliminate questions that are not likely to contribute to learning (and thus further assure high quality of the training data). This is achieved during re-sampling by randomly selecting a subset from the majority class (step 518), and applying standard classifiers (e.g., decision tree, naïve onto the re-balanced data sets comparing the accuracies, preferably based on a distance measure (between correct and incorrect answers)).

At step 524, the remaining selected questions are then added to the training set T and, at step 526, used to train a new classifier. This completes the processing.

A variant of the above-identified process include, for example, using the training set to train the initial classifier (to create the new classifier), iterating through the entire process with additional unlabeled datasets, or the like.

Generalizing, a particular question is associated with a set of possible answers. A question may be grouped with one or more other questions into a group of questions (e.g., as a set of training questions), and a particular question may having a question identifier. A question may have a "loss" associated therewith, which is sometimes referred to herein as a "loss of a question" (or the "loss for a question"). The loss of a question is a question loss function that, in turn, is computed by determining the "loss" of each answer to the question (if there are multiple such answers) and then computing the average of such answer loss values. Thus, a loss of a question is determined by the average loss as computed for the one or more answers for the question. A conditional distribution of this form is computed for each question and its associated set of answers. Questions are then ranked according to an algorithm that minimizes the loss of the question, which, as noted above, in turn can be computed from the loss of each answer associated with the question.

Figure 6:
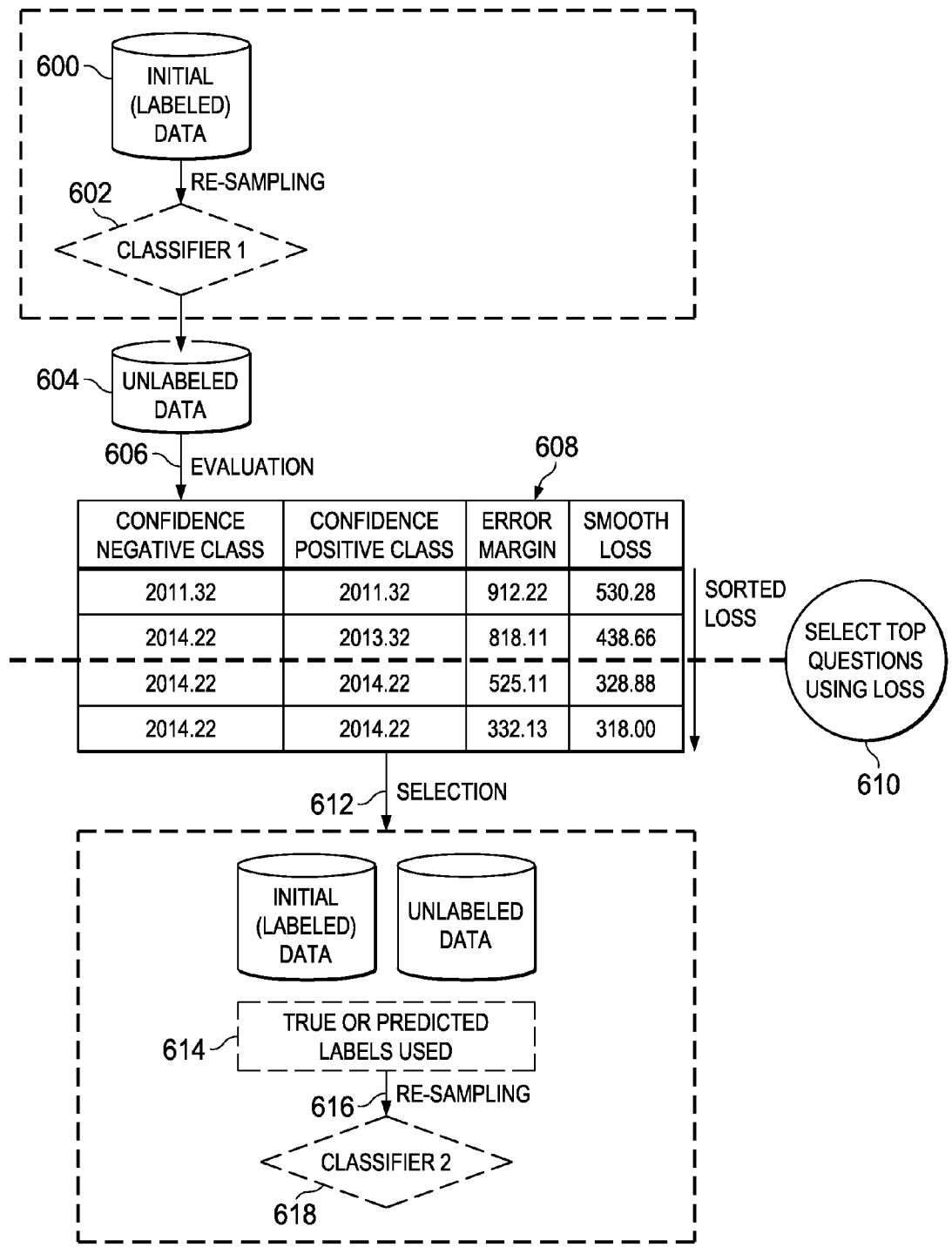
FIG. 6 provides a visualization of the process flow of FIG. 5.

FIG. 6 illustrates the above-described process. The initial (labeled) data set 600 serves as the training set to obtain the initial statistical model (Classifier 1) 602. After the initial statistical model 602 is trained, an unlabeled dataset 604 is evaluated 606 according to the loss function (an example shown at 608) to facilitate selection 610 of the questions 612. Given that selection, the true or predicted labels 614 are then applied. Re-sampling 616 is then carried out using the distance measure that differentiates between correct and incorrect answers for each question. The questions corresponding to the largest difference(s) are then chosen as the final result set. The new statistical model (Classifier 2) 618 is then trained on the Q-A pairs resulting from the final result set of selected questions.

FIG. 7 provides further details of the re-sampling procedure that is used during the question selection process to further prune the questions using the (answer) distance measurements. The following are given as initializations 700: the initial labeled dataset L, the classifier (statistical model) h, and a parameter r that indicates how many questions are to be selected. The algorithm preferably identifies three groups of questions: (i) "correct questions," wherein the top ranked answer is correct; (ii) "purely negative questions," wherein no correct answer is available for this answer (either in the whole set or after applying a threshold) such that the system has no chance to get this question right or to learn based on it; and (iii) "false questions," wherein the top-ranked answer was incorrect, but a correct answer for this question is available in the dataset. According to this procedure, preferably all the "purely negative questions" are discarded, and the selected dataset is initialized with the "correct questions." The "false questions" then constitute a candidate set $C_0$.

The main loop 702 of the re-sampling procedure preferably is based on a distance between correct and incorrect answers, preferably measured as a distance between two Gaussian distributions. A non-limiting example of such a distance measure is a Mahalanobis distance.

During iteration of the procedure, and as shown in the main loop in FIG. 7, preferably a random sample of questions is drawn from the candidate set. This is step 704 Implementation of the random procedure should assure that the questions are drawn according to their distribution. It can be implemented, for example, by using a k-d tree to represent the spatial structure of the data and selecting questions from different nodes. For each question in the random sample, the routine calculates what would be a distance between correct and incorrect answers if the considered question were added to the dataset. This is step 706. The questions that maximize the distance are then chosen. This is step 708. This operation has the effect of re-balancing the dataset. This selection criterion can be changed for some specific applications. The re-sampling procedure is not necessarily required.

Thus, according to this approach of this disclosure, a classifier (the statistical model) is used to obtain predictions on the unlabeled data received in the framework. This data is used to calculate the total margin for each question. Then, question selection is performed to select the questions, preferably the ones with the greatest margins. The selected questions are then labeled. These labels are then added to the training set, and the classifier is incrementally trained (to become a new classifier) with the new combined set.

The subject matter described herein has significant advantages over the prior art. It facilitates the selection of highly discriminative questions from unlabeled data. The questions can then be used to train a statistical machine learning model, for example, in a question-answering system. The approach provides significantly improved results as compared to existing solutions (to the class imbalance problem), which typically just involve resampling training data, or adjusting the machine learning model.

More generally, the question selection functionality described above may be implemented as a standalone approach, e.g., a software-based function executed by a processor, or it may be available as a managed service (including as a web service via a SOAP/XML interface), in whole or in part. The particular hardware and software implementation details described herein are merely for illustrative purposes are not meant to limit the scope of the described subject matter.

More generally, computing devices within the context of the disclosed subject matter are each a data processing system (such as shown in FIG. 2, or FIG. 3) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the functionality of the query generation component is implemented in software, which includes but is not limited to firmware, resident software, microcode, and the like. The functions may be integrated into other applications, or built into software for this specific purpose (of facilitating the natural language query generation. Furthermore, the device-specific functionality may take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A computer-readable storage medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the device-specific components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The computing entity that interacts with the Q&A system is not limited to any particular device, configuration, or functionality. The interaction may be implemented from any computing entity, including mobile phone, tablet, laptop, notebook, desktop, television, electronic gaming system, intelligent vehicle, or other system or appliance.

The techniques herein generally provide for the above-described improvements to a technology or technical field, as well as the specific technological improvements to machine learning and modeling-based question answering systems, such as described above.

Having described our invention, what we now claim is as follows.

The invention claimed is:

1. A method to improve a question and answer (Q&A) information retrieval system that uses a knowledgebase a set of labeled question-answer pairs and machine learning to respond to natural language-based queries, comprising:
   training an initial machine learning statistical model using the set of labeled question-answer pairs;
   receiving and evaluating a set of unlabeled data that includes question-answer pairs;

ranking questions derived from the set of unlabeled data in part using a question loss function that represents a loss value computed for a particular question having a set of one or more answers classified as correct, wherein the loss value for the particular question is computed as a function of loss values for the one or more answers associated therewith;

selecting questions from the ranking to produce a set of discriminative questions;

applying labels to the set of discriminative questions using the initial machine learning model and updating the knowledgebase to include the set of discriminative questions so labeled; and executing the Q&A information retrieval system machine learning at least in part against a dataset that includes the set of discriminative questions;

wherein at least one or more operations are performed in software executing in a hardware element.

2. The method as described in claim 1 further including using the set of discriminative questions to train a new machine learning statistical model.

3. The method as described in claim 1 wherein evaluating the unlabeled data includes pre-processing question-answer pairs by partitioning an answer space into a spatial-oriented data structure.

4. The method as described in claim 3 wherein the pre-processing uses a spatial-directed clustering algorithm.

5. The method as described in claim 3 further including re-sampling a subset of the questions selected from the ranking by re-sampling data from the spatial-oriented data structure.

6. The method as described in claim 5 wherein the re-sampling is based on a distance measure between correct and incorrect answers in the unlabeled data.

7. The method as described in claim 1 wherein the question loss function is computed by:

computing a loss of each answer; and computing an average loss of the answers for a question;

wherein questions are ranked according to an algorithm that minimizes a selected number of questions from the set of questions and reduces the average loss for at least one question.

8. Apparatus, comprising:

a processor; and computer memory holding computer program instructions executed by the processor to improve a question and answer (Q&A) information retrieval system that uses a knowledgebase a set of labeled question-answer pairs and machine learning to respond to natural language-based queries, the computer program instructions configured to:

train an initial machine learning statistical model using the set of labeled question-answer pairs;

receive and evaluate a set of unlabeled data that includes question-answer pairs;

rank questions derived from the set of unlabeled data in part using a question loss function that represents a loss value computed for a particular question having a set of one or more answers classified as correct, wherein the loss value for the particular question is computed as a function of loss values for the one or more answers associated therewith;

select questions from the ranking to produce a set of discriminative questions;

apply labels to the set of discriminative questions using the initial machine learning model and update the knowledgebase to include the set of discriminative questions so labeled; and execute the Q&A information retrieval system machine learning at least in part against a dataset that includes the set of discriminative questions.

9. The apparatus as described in claim 8 wherein the computer program instructions are further configured to use the set of discriminative questions to train a new machine learning statistical model.

10. The apparatus as described in claim 8 wherein the computer program instructions are further configured to pre-process question-answer pairs by partitioning an answer space into a spatial-oriented data structure.

11. The apparatus as described in claim 10 wherein the pre-processing uses a spatial-directed clustering algorithm.

12. The apparatus as described in claim 10 wherein the computer program instructions are further configured to re-sample a subset of the questions selected from the ranking by re-sampling data from the spatial-oriented data structure.

13. The apparatus as described in claim 12 wherein the re-sampling is based on a distance measure between correct and incorrect answers in the unlabeled data.

14. The apparatus as described in claim 8 wherein the loss function is computed by computer program instructions that are further configured to:

compute a loss of each answer; and compute an average loss of the answers for a question;

wherein questions are ranked according to an algorithm that minimizes a selected number of questions from the set of questions and reduces the average loss for at least one question.

15. A computer program product in a non-transitory computer readable storage medium for use in a computing entity, the computer program product holding computer program instructions which, when executed, improve a question and answer (Q&A) information retrieval system that uses a knowledgebase a set of labeled question-answer pairs and machine learning to respond to natural language-based queries, the computer program instructions configured to:

train an initial machine learning statistical model using the set of labeled question-answer pairs;

receive and evaluate a set of unlabeled data that includes question-answer pairs;

rank questions derived from the set of unlabeled data in part using a question loss function that represents a loss value computed for a particular question having a set of one or more answers classified as correct, wherein the loss value for the particular question is computed as a function of loss values for the one or more answers associated therewith;

select questions from the ranking to produce a set of discriminative questions; and apply labels to the set of discriminative questions using the initial machine learning model and update the knowledgebase to include the set of discriminative questions so labeled; and execute the Q&A information retrieval system machine learning at least in part against a dataset that includes the set of discriminative questions.

16. The computer program product as described in claim 15 wherein the computer program instructions are further configured to use the set of discriminative questions to train a new machine learning statistical model.

17. The computer program product as described in claim 15 wherein the computer program instructions are further configured to pre-process question-answer pairs by partitioning an answer space into a spatial-oriented data structure.

18. The computer program product as described in claim 17 wherein the pre-processing uses a spatial-directed clustering algorithm.

19. The computer program product as described in claim 15 wherein the computer program instructions are further configured to re-sample a subset of the questions selected from the ranking by re-sampling data from the spatial-oriented data structure.

20. The computer program product as described in claim 19 wherein the re-sampling is based on a distance measure between correct and incorrect answers in the unlabeled data.

21. The computer program product as described in claim 15 wherein the question loss function is computed by computer program instructions that are further configured to:
   compute a loss of each answer; and
   compute an average loss of the answers for a question;
   wherein questions are ranked according to an algorithm that minimizes a selected number of questions from the set of questions and reduces the average loss for at least one question.

* * * * *